(12) United States Patent (10) Patent No.: US 8,863,938 B2
Morel (45) Date of Patent: Oct. 21, 2014

(54) TRANSPORT DEVICE FOR AGRICULTURAL UTILITY MACHINE AND AGRICULTURAL UTILITY MACHINE

(71) Applicant: Schaeffler Technologies AG & Co. KG, Herzogenaurach (DE)

(72) Inventor: Sebastien Morel, Kilstett (FR)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/848,803

(22) Filed: Mar. 22, 2013

(65) Prior Publication Data

US 2013/0319823 A1 Dec. 5, 2013

(30) Foreign Application Priority Data

May 31, 2012 (DE) .......................... 10 2012 209 236

(51) Int. Cl.
| | |
|---|---|
| B60P 1/00 | (2006.01) |
| B65G 33/32 | (2006.01) |
| B65G 33/14 | (2006.01) |
| A01D 61/00 | (2006.01) |
| B65G 37/00 | (2006.01) |

(52) U.S. Cl.
CPC ................ A01D 61/00 (2013.01); B65G 33/32 (2013.01); B65G 33/14 (2013.01); B65G 37/00 (2013.01)
USPC ............................ 198/668; 198/666; 198/674

(58) Field of Classification Search
USPC ......... 198/317, 584, 608, 658, 666, 668, 674; 414/502, 509, 523; 460/114
See application file for complete search history.

(56) References Cited

U.S. PATENT DOCUMENTS

| | | | | | |
|---|---|---|---|---|---|
| 3,568,819 | A | * | 3/1971 | Mann .............................. | 198/536 |
| 3,589,111 | A | * | 6/1971 | Gullickson et al. ............ | 56/12.8 |
| 3,700,179 | A | * | 10/1972 | Van Peursem ................. | 241/301 |
| 3,765,547 | A | * | 10/1973 | Shivvers ........................ | 366/131 |
| 4,015,734 | A | * | 4/1977 | Laidig ............................ | 414/310 |
| 4,043,441 | A | * | 8/1977 | Johnson ......................... | 198/317 |
| 4,274,790 | A | * | 6/1981 | Barker ........................... | 414/502 |
| 4,472,183 | A | * | 9/1984 | Mace .............................. | 55/378 |
| 4,621,968 | A | * | 11/1986 | Hutchison ..................... | 414/311 |
| 4,715,302 | A | * | 12/1987 | Briggs ........................... | 111/173 |
| 4,741,264 | A | * | 5/1988 | McPeak .......................... | 99/483 |
| 5,191,966 | A | * | 3/1993 | Miller et al. ................... | 198/493 |
| 5,628,608 | A | * | 5/1997 | Linscheid et al. ............. | 414/526 |
| 5,678,440 | A | * | 10/1997 | Hamilton ........................ | 72/136 |
| 5,863,101 | A | * | 1/1999 | Seear ............................. | 299/68 |
| 6,113,339 | A | * | 9/2000 | Adams ........................... | 414/505 |
| 6,422,785 | B1 | * | 7/2002 | Ruggles et al. ................ | 404/72 |
| 6,604,995 | B2 | * | 8/2003 | Dillon et al. ................... | 460/111 |
| 7,040,980 | B1 | * | 5/2006 | Kestel ............................ | 460/114 |
| 7,198,449 | B2 | * | 4/2007 | Dillon ............................ | 414/502 |
| 8,270,881 | B2 | * | 9/2012 | Kim ................................ | 399/254 |
| 8,272,494 | B2 | * | 9/2012 | Zazula et al. .................. | 198/313 |
| 8,333,272 | B2 | * | 12/2012 | Wheals et al. ............ | 192/113.31 |

* cited by examiner

*Primary Examiner* — Douglas Hess
(74) *Attorney, Agent, or Firm* — Volpe and Koenig, P.C.

(57) ABSTRACT

A transport device for an agricultural utility machine is provided, having a first pipe section in which a first conveyor auger is rotatably situated and a second pipe section in which a second conveyor auger is rotatably situated, and a joint and/or plug device to connect the first pipe section to the second pipe section. A friction clutch is provided between the first and the second conveyor auger to transfer torque from the first conveyor auger to the second conveyor auger. An agricultural utility machine having such a transport device is also provided.

13 Claims, 2 Drawing Sheets

TRANSPORT DEVICE FOR AGRICULTURAL UTILITY MACHINE AND AGRICULTURAL UTILITY MACHINE

INCORPORATION BY REFERENCE

The following documents are incorporated herein by reference as if fully set forth: German Patent Application No. 102012209236.6, filed May 31, 2012.

BACKGROUND

The present invention relates to a transport device for an agricultural utility machine. In particular, the present invention relates to a discharge pipe for a combine harvester. The present invention also relates to an agricultural utility machine having such a transport device, or a combine harvester having such a discharge pipe.

It is considered to be known that discharge pipes of combine harvesters equipped with conveyor augers can be designed with multiple parts. By the use of a joint or plug connection, the multiple-part discharge pipes can be transported in a space-saving manner in either a disconnected or disassembled state, for example if the combine harvester is being transported on public roads, while the multiple-part discharge pipes in the connected operating state are long enough to enable sufficient distance between the combine harvester during harvesting operation and the tractor combination that accompanies the combine harvester and receives the harvested grain. It is also considered to be known that the transfer of torque from a first conveyor auger that transports the harvested grain, which is rotatably situated in a first section of the pipe, to a second conveyor auger that transports the harvested grain, which is rotatably situated in a second section of the pipe, takes place by means of a claw clutch.

A claw clutch of this sort is susceptible to torque spikes, in particular when the conveyor auger is started up, if the claws are not completely meshed, or have free travel in order to enable a simple disconnection and connection of the sections of the pipe. The torque spikes can result in the destruction of the claw clutch.

SUMMARY

It is therefore the object of the present invention to provide a transport device for an agricultural utility machine, as well as an agricultural utility machine, in which individual conveyor augers can be reliably connected to each other to transfer torque.

This object is fulfilled according to the invention by a transport device for an agricultural utility machine, having a first pipe section in which a first conveyor auger is rotatably situated and a second pipe section in which a second conveyor auger is rotatably situated, and a joint and/or plug device for connecting the first pipe section to the second pipe section, there being a friction clutch provided between the first and second conveyor augers in order to transfer torque from the first conveyor auger to the second conveyor auger. Torque spikes can be intercepted by the slippage in the preferably spring-preloaded friction clutch.

In particular, the transport device is a discharge pipe for transporting bulk goods, in particular harvested goods such as grain. In this connection, the transport device is preferably employed in or on a combine harvester.

Preferred exemplary embodiments of the present invention are explained below and in the claims.

Preferably, the friction clutch is provided in the area of the joint and/or plug device. In the disconnected or disassembled condition of the transport device, one part of the clutch can be incorporated into the first pipe section, while another part of the clutch can be incorporated into the second pipe section.

Also preferably, an opposing pressure plate of the friction clutch is connected to the first conveyor auger in a rotationally fixed connection, and a pressure plate of the friction clutch that is limitedly movable in the axial direction is connected to the second conveyor auger in a rotationally fixed connection.

It is advantageous here if a plurality of coupling elements are provided between the pressure plate and the second conveyor auger, distributed in the circumferential direction, for limited movement in the axial direction and for rotationally fixed connection of the pressure plate to the second conveyor auger. The coupling elements are preferably in the form of bolts or leaf springs. The axially fixed opposing pressure plate may be integrated into the end of the first conveyor auger, in order to enable the continuous transporting of the bulk goods from the first conveyor auger to the second conveyor auger.

According to another preferred exemplary embodiment, the opposing pressure plate and/or the pressure plate have in their radially outer area a housing section which forms a clutch plate housing to receive a clutch plate when the first pipe section is connected to the second pipe section. The clutch plate housing prevents bulk goods from being able to get into the friction clutch during operation of the coupled conveyor auger.

It is also advantageous here if a section of the conveyor auger is provided in an external area of the housing section, so as to enable the continuous transportation of the bulk goods from the first conveyor auger to the second conveyor auger.

Preferably, a, or the forenamed clutch plate of the friction clutch, is connected to the first conveyor auger or to the second conveyor auger in a rotationally fixed connection.

According to another preferred exemplary embodiment, a single- or multiple-part clutch cover of the friction clutch is connected to the first and/or the second conveyor auger in a rotationally fixed connection. In particular, the axially fixed clutch cover may be integrated into the end of the second conveyor auger, in order to enable continuous transporting of the bulk goods from the first conveyor auger to the second conveyor auger.

Preferably an energy storage device, preferably a diaphragm spring or leaf spring, is provided in the axial direction between the clutch cover and the pressure plate. This enables a simple spring-loading of the friction clutch.

Also preferably, the power storage device is designed to be pre-tensioned when the first pipe section is connected to the second pipe section, and to shift the pressure plate in the axial direction to clamp the clutch plate frictionally between the pressure plate and the opposing pressure plate.

The previously noted objective is also fulfilled according to the invention by an agricultural utility machine having a storage container for bulk goods and a transport device connected to the storage container, according to at least one of the preceding exemplary embodiments. The agricultural utility machine is in particular a combine harvester having an auger-operated discharge pipe for grain, which is transported from the storage container into a tractor combination which accompanies the combine harvester during harvesting operation.

BRIEF DESCRIPTION OF THE DRAWINGS

The present invention will be explained in greater detail below on the basis of preferred exemplary embodiments in connection with the associated figures. They show the following.

DETAILED DESCRIPTION OF THE PREFERRED EMBODIMENTS

Figure 1:
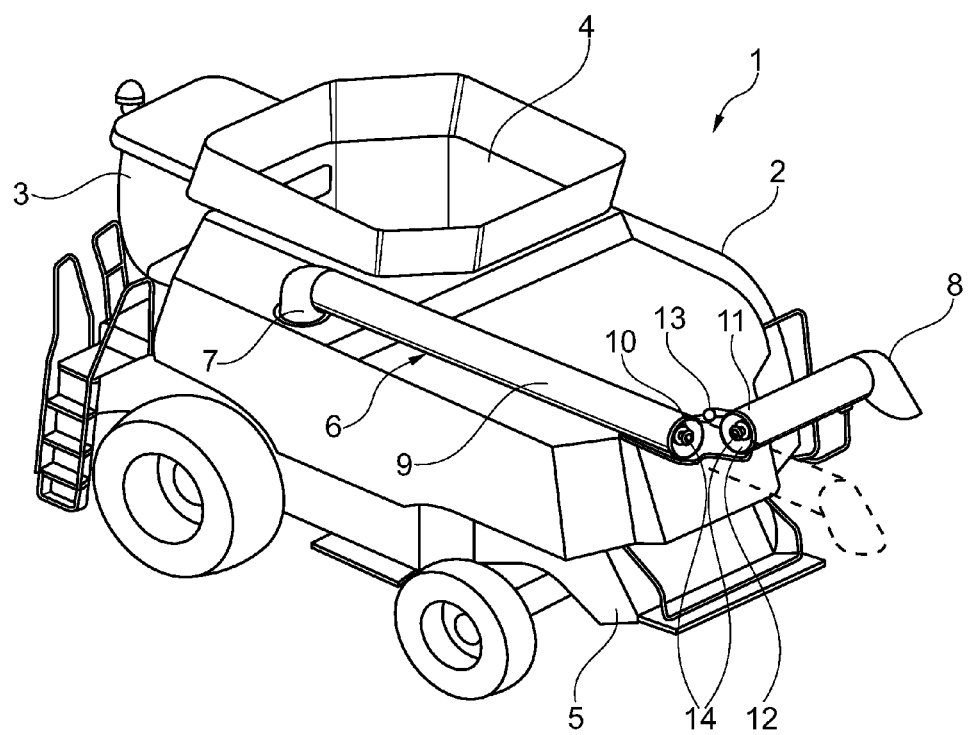
FIG. 1 shows an exemplary embodiment of an agricultural utility machine having a multiple-part, auger-operated transport device for transporting bulk goods.
Figure 2:
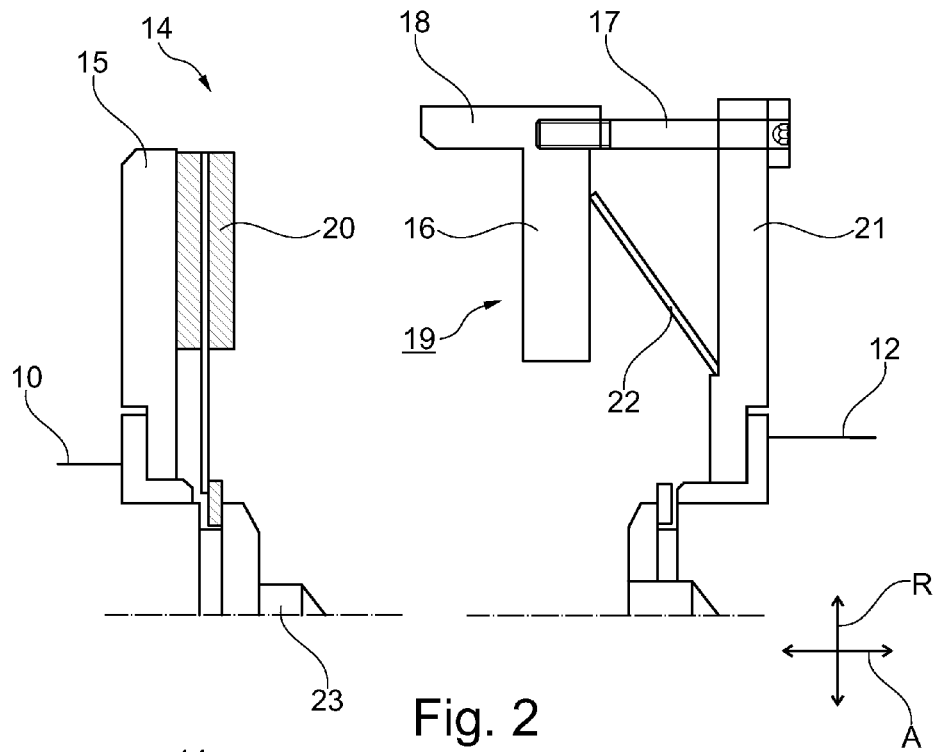
FIG. 2 shows an exemplary embodiment of a friction clutch with the transport device from FIG. 1 in a disconnected or disassembled state.
Figure 3:
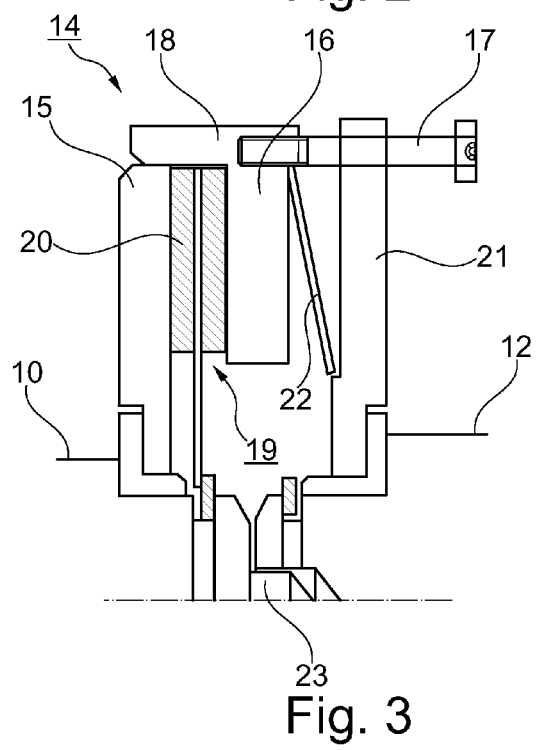
FIG. 3 shows the friction clutch from FIG. 2 with the transport device in connected or assembled state.

FIGS. 1 through 3 relate to a preferred exemplary embodiment of an agricultural utility machine, in particular a combine harvester 1, having a multiple-part, auger-operated transport device for transporting bulk goods, in particular a multiple-part auger-operated discharge spout 6 for transporting harvested goods such as grain. Features that are not identified in the present description as essential to the invention are to be understood as optional. The following description therefore also relates to additional exemplary embodiments of the combine harvester 1 or of the discharge pipe 6, which have partial combinations of the features which will be explained below.

The combine harvester 1 has a housing 2, a driver's cab 3, a storage container 4 and the discharge pipe 6. The combine harvester 1 can be combined with a mowing unit (not shown), which is usually provided on the front of the vehicle shown in FIG. 1, i.e., in front of the driver's cab 3. Grain cut off by the mowing unit is transported to a separator (not shown), in which the grain stalks are separated into the grain, which is then transported to the storage container 4, and straw, which is discharged from the combine harvester 1 through a chopper 5.

The discharge pipe 6 is designed to transport the grain from the storage container 4 of the combine harvester 1 into the bulk goods wagon of an accompanying vehicle, for example a tractor combination. In an input area 7, the discharge pipe 6 is connected to the storage container 4 and mounted so that it can rotate around a vertical axis. The discharge pipe 6 is designed in multiple parts, with the input area 7 transitioning into a first pipe section 9. A second pipe section 11 is attached to the first pipe section 9 by means of a joint device 13.

In the disconnected state, which is shown in FIG. 1 with solid lines, the discharge pipe 6 can be transported on the combine harvester 1 in a space-saving manner, for example if the combine harvester 1 is being transported on public roads. In the connected operating state, which is shown with dashed lines in FIG. 1, the discharge pipe 6 has sufficient length so that during the harvesting operation the accompanying tractor combination can drive at a sufficient distance parallel to the combine harvester 1 and then loaded with grain by the combine harvester 1.

Alternatively or in addition to the joint device 13, a plug device that can be completely disassembled for transporting purposes and then connected for harvesting operation may be provided, by means of which the two pipe sections 9, 11 are connected together. The discharge pipe u6 may have more than two pipe sections 9, 11 that can be connected to each other. The last, i.e., in the depicted exemplary embodiment the second pipe section 11, transitions to an output area 8, from which the grain falls into the bulk goods wagon of the tractor combination.

A first conveyor auger 10, which is connected in the input area 7 for example by means of a bevel gear set, a cardan shaft or a synchronous shaft to a drive motor, for example via a connecting gear set to a driving motor of the combine harvester 1 or to a separate drive motor, such as an electric motor, is rotatably supported in the first pipe section 9. In the second pipe section 11 a second conveyor auger 12 is rotatably supported, which is connectible to the first conveyor auger 10 by means of a friction clutch 14 to transfer torque from the first conveyor auger 10 to the second conveyor auger 12.

The friction clutch 14 is provided in the area of the joint and/or plug device 13. In the disconnected or disassembled state of the discharge pipe 6, one part of the friction clutch 14 is received in the first pipe section 9, while another part of the friction clutch 14 is received in the second pipe section 11, which is depicted more precisely in FIG. 2 (disassembled state) and FIG. 3 (assembled operating state). Stated more precisely, an opposing pressure plate 15 of the friction clutch 14 is connected to the first conveyor auger 10 in a rotationally fixed connection. A pressure plate 16 of the friction clutch 14 which is limitedly movable in axial direction A is connected to the second conveyor auger 12 in a rotationally fixed connection.

A clutch plate 20 of the friction clutch 14 in the depicted exemplary embodiment is connected to the first conveyor auger 10 or to the opposing pressure plate 15 in a rotationally fixed connection, but can also be connected to the second conveyor auger 12 or to the pressure plate 16 in a rotationally fixed connection.

A one-piece clutch cover 21 of the friction clutch 14 in the depicted exemplary embodiment is connected to the second conveyor auger 12 in a rotationally fixed connection, but alternatively can also be connected to the first conveyor auger 10 in a rotationally fixed connection. It is likewise possible that the clutch cover 21 is designed in multiple parts, where one part of the clutch cover 21 is connected to the first conveyor auger 10 and another part of the clutch cover 21 is connected to the second conveyor auger 12.

Between the pressure plate 16 and the second conveyor auger 12, to be more precise the clutch cover 21, in the radially outer area of the clutch cover 21 a plurality of coupling elements 17 are provided, distributed in the circumferential direction, preferably bolts or leaf springs, for limited movement of the pressure plate 16 in axial direction A and for rotationally fixed connection of the pressure plate 16 to the second conveyor auger 12.

An energy storage device, preferably a diaphragm spring or leaf spring, is provided in the axial direction A between the clutch cover 21 and the pressure plate 16, in order to be pre-tensioned when the first pipe section 9 is connected to the second pipe section 11, and to shift the pressure plate 16 in axial direction A to clamp the clutch plate 20 frictionally between the pressure plate 16 and the opposing pressure plate 15. In order to center the two conveyor augers 10, 12 on each other when connecting or assembling the two pipe sections 9, 11, a centering device 23 is provided on one or both faces of the conveyor auger or augers 10, 12, for example in the form of a centering pin and a corresponding recess.

The pressure plate 16 in the depicted exemplary embodiment has in its radial external area a housing section 18 protruding in axial direction A, which together with the opposing pressure plate 15 forms a clutch plate housing 19 to receive the clutch plate 20 when the first pipe section 9 is connected to the second pipe section 11. Alternatively or in addition, the opposing pressure plate 15 may also have such a housing section 18 protruding in axial direction A in its radially external area.

It should be mentioned at this point, that to simplify the depiction in FIGS. 2 and 3 the conveyor augers 10, 12 are shown only as shafts, i.e., without their screw flights. In order to enable continuous transporting of the grain in the discharge pipe 6, it is advantageous if the opposing pressure plate 15 is integrated in radial direction R within the screw flight of the first conveyor auger 10, the clutch cover 21 is integrated in radial direction R within the screw flight of the second conveyor auger 12, and the housing section is provided in radial direction R outside with a screw flight.

The preceding exemplary embodiments relate to a transport device, in particular a discharge pipe 6, for an agricultural utility machine, in particular for a combine harvester 1, having a first pipe section 9 in which a first conveyor auger 10 is rotatably situated and a second pipe section 11 in which a second conveyor auger 12 is rotatably situated, and a joint and/or plug device 13 for connecting the first pipe section 9 to the second pipe section 11, there being a friction clutch 14 provided between the first and second conveyor augers 10, 12 to transfer torque from the first conveyor auger 10 to the second conveyor auger 12.

The preceding exemplary embodiments also relate to an agricultural utility machine, in particular a combine harvester 1, having a storage container 4 for bulk goods, in particular for grain, and a transport device according to at least one of the preceding exemplary embodiments connected to the storage container 4.

REFERENCE LABELS 1 combine harvester
2 housing
3 driver's cab
4 storage container
5 chopper
6 discharge pipe
7 input area
8 output area
9 first pipe section
10 first conveyor auger
11 second pipe section
12 second conveyor auger
13 joint and/or plug device
14 friction clutch
15 opposing pressure plate
16 pressure plate
17 coupling element
18 housing section
19 clutch plate housing
20 clutch plate
21 clutch cover
22 energy storage device
23 centering device
A axial direction
R radial direction This invention claimed is:

1. A transport device for an agricultural utility machine, comprising a first pipe section in which a first conveyor auger is rotatably situated and a second pipe section in which a second conveyor auger is rotatably situated, and at least one of a joint or plug device that connects the first pipe section to the second pipe section, and a friction clutch is provided between the first and second conveyor augers to transfer torque from the first conveyor auger to the second conveyor auger.

2. The transport device according to claim 1, wherein the friction clutch is provided in an area of the at least one of the joint or plug device.

3. An agricultural utility machine comprising a storage container for bulk goods, and a transport device according to claim 1 connected to the storage container.

4. The agricultural utility machine of claim 3, wherein the agricultural utility machine comprises a combine harvester.

5. A transport device for an agricultural utility machine, comprising a first pipe section in which a first conveyor auger is rotatably situated and a second pipe section in which a second conveyor auger is rotatably situated, and at least one of a joint or plug device that connects the first pipe section to the second pipe section, and a friction clutch is provided between the first and second conveyor augers to transfer torque from the first conveyor auger to the second conveyor auger, wherein an opposing pressure plate of the friction clutch is connected to the first conveyor auger in a rotationally fixed connection, and a pressure plate of the friction clutch that is limitedly movable in axial direction is connected to the second conveyor auger in a rotationally fixed connection.

6. The transport device according to claim 5, wherein a plurality of coupling elements are provided between the pressure plate and the second conveyor auger, the coupling elements are distributed in a circumferential direction and provide for limited movement in an axial direction and for rotationally fixed connection of the pressure plate to the second conveyor auger.

7. The transport device according to claim 6, wherein the coupling elements are bolts or leaf springs.

8. The transport device according to claim 6, wherein at least one of the opposing pressure plate or the pressure plate have in a radially outer area thereof a housing section, which forms a clutch plate housing to receive a clutch plate when the first pipe section is connected to the second pipe section.

9. The transport device according to claim 8, wherein the clutch plate of the friction clutch is connected to the first conveyor auger or to the second conveyor auger in a rotationally fixed connection.

10. A transport device for an agricultural utility machine, comprising a first pipe section in which a first conveyor auger is rotatably situated and a second pipe section in which a second conveyor auger is rotatably situated, and at least one of a joint or plug device that connects the first pipe section to the second pipe section, a friction clutch is provided between the first and second conveyor augers to transfer torque from the first conveyor auger to the second conveyor auger, wherein a single- or multiple-part clutch cover of the friction clutch is connected to at least one of the first or the second conveyor auger in a rotationally fixed connection.

11. The transport device according to claim 10, wherein an energy storage device is provided in an axial direction between the clutch cover and a pressure plate of the friction clutch.

12. The transport device according to claim 11, wherein the energy storage device comprises a diaphragm spring or leaf spring.

13. The transport device according to claim 11, wherein the energy storage device is pre-tensioned when the first pipe section is connected to the second pipe section, and to shift the pressure plate in the axial direction to clamp a clutch plate frictionally between the pressure plate and an opposing pressure plate.

* * * * *